United States Patent
Mazouer et al.

(10) Patent No.: US 11,897,052 B2
(45) Date of Patent: Feb. 13, 2024

(54) APPARATUS FOR MACHINING A WORKPIECE WITH A LASER BEAM COUPLED INTO A FLUID JET, WITH AUTOMATIC LASER-NOZZLE ALIGNMENT; METHOD OF ALIGNING SUCH A BEAM

(71) Applicants: SYNOVA S.A., Duillier (CH); Makino Milling Machine Co., Ltd., Tokyo (JP)

(72) Inventors: Philippe Mazouer, Neuchâtel (CH); Max Epple, Assens (CH); Hyuk Kim, Tokyo (JP); Helgi Diehl, Morges (CH); Bernold Richerzhagen, Saint-Sulpice (CH)

(73) Assignees: SYNOVA S.A., Duillier (CH); Makino Milling Machine Co. Ltd., Tokyo (JP)

( * ) Notice: Subject to any disclaimer, the term of this patent is extended or adjusted under 35 U.S.C. 154(b) by 375 days.

(21) Appl. No.: 16/970,430

(22) PCT Filed: Mar. 1, 2019

(86) PCT No.: PCT/EP2019/055164
§ 371 (c)(1),
(2) Date: Aug. 17, 2020

(87) PCT Pub. No.: WO2019/166638
PCT Pub. Date: Sep. 6, 2019

(65) Prior Publication Data
US 2021/0107089 A1    Apr. 15, 2021

(30) Foreign Application Priority Data
Mar. 1, 2018   (EP) .................................... 18159471

(51) Int. Cl.
*B23K 26/03*    (2006.01)
*B23K 26/146*   (2014.01)
(Continued)

(52) U.S. Cl.
CPC ............ *B23K 26/03* (2013.01); *B23K 26/043* (2013.01); *B23K 26/146* (2015.10); *B23K 26/1476* (2013.01)

(58) Field of Classification Search
CPC .. B23K 26/032; B23K 26/042; B23K 26/146; B23K 26/03; B23K 26/043;
(Continued)

(56) References Cited

U.S. PATENT DOCUMENTS

| 10,780,527 B2 | 9/2020 | Richerzhagen et al. |
| 11,007,603 B2 | 5/2021 | Toyama et al. |

(Continued)

FOREIGN PATENT DOCUMENTS

| DE | 10 2007 013623 A1 | 10/2008 |
| DE | 102007013623 A1 | 10/2008 |

(Continued)

OTHER PUBLICATIONS

International Search Report issued in connection with the corresponding International Application No. PCT/EP2019/055164 dated May 27, 2019.

(Continued)

*Primary Examiner* — Chris Q Liu
(74) *Attorney, Agent, or Firm* — The H.T. Than Law Group

(57) ABSTRACT

The invention relates to an apparatus 100 for machining a workpiece with a laser beam 101 coupled into a fluid jet. The apparatus 100 comprises a laser unit 101*a* for providing the laser beam 101, a nozzle unit 102 with an aperture 102*a* for producing the fluid jet, and an optical unit 103 configured to provide the laser beam 101 from the laser unit 101*a* onto the nozzle unit 102. Further, the apparatus 100 comprises a control unit 104 configured to control 108, 110 the optical unit 103 and/or nozzle unit 102 to change a point of (Continued)

incidence 109 of the laser beam 101 on the nozzle unit 102. The apparatus 100 also comprises a sensing unit 105 configured to sense laser light 106 reflected from a surface 102*b* of the nozzle unit 102 and produce a sensing signal 107 based on the sensed reflected laser light 106. The control unit 104 is particularly configured to evaluate the sensing signal 107 and to determine a defined sensing pattern in the sensing signal 107 indicative of the laser beam 101 being fully and/or partially aligned with the aperture 102*a*.

20 Claims, 8 Drawing Sheets

(51) Int. Cl.
*B23K 26/04* (2014.01)
*B23K 26/14* (2014.01)

(58) Field of Classification Search
CPC .. B23K 26/142; B23K 26/705; B23K 26/009; B23K 26/04; B23K 26/046; B23K 26/0643; B23K 26/0648; B23K 26/082; B23K 26/0853; B23K 26/0876; B23K 26/1224; B23K 26/14; B23K 26/356; B23K 26/36; B23K 26/38; B23K 1/0056; B23K 20/008; B23K 2101/40; B23K 2103/50; B23K 26/0093; B23K 26/02; B23K 26/037; B23K 26/048; B23K 26/064; B23K 26/0652; B23K 26/0665; B23K 26/073; B23K 26/08; B23K 26/0861; B23K 26/0869; B23K 26/10; B23K 26/1494; B23K 26/18; B23K 26/20; B23K 26/206; B23K 26/21; B23K 26/211; B23K 26/24; B23K 26/34; B23K 26/351; B23K 26/364; B23K 26/40; B23K 26/702; B23K 31/125
USPC .............. 219/121.85, 121.73, 121.83, 121.6, 219/121.61, 121.62, 121.63, 121.64, 219/121.67, 121.68, 121.72, 121.78, 219/121.81, 121.82
See application file for complete search history.

(56) References Cited

U.S. PATENT DOCUMENTS

| 11,148,223 | B2 | 10/2021 | Toyama et al. | |
|---|---|---|---|---|
| 2009/0001063 | A1* | 1/2009 | Weick | B23K 26/0648 219/121.85 |
| 2012/0074105 | A1* | 3/2012 | Okamoto | B23K 26/146 219/121.72 |
| 2013/0092666 | A1* | 4/2013 | Oh | B23K 26/037 219/121.64 |
| 2014/0014632 | A1 | 1/2014 | Cathry et al. | |
| 2016/0008920 | A1* | 1/2016 | Goya | B23K 26/36 219/121.61 |
| 2017/0361399 | A1 | 12/2017 | Toyama et al. | |

FOREIGN PATENT DOCUMENTS

| JP | 2009 262163 A | 11/2009 |
|---|---|---|
| JP | 2011212710 A | 10/2011 |
| JP | 2011235347 A | 11/2011 |
| JP | 2018015808 A | 2/2018 |

OTHER PUBLICATIONS

Machine translation of DE 10 2007 013623 to Haeberle et al.
Machine translation of JP 2009 262163 to Sugino Mach.
Korean Office Action and its English translation issued in connection with the corresponding Korean Patent Application No. 10-2020-7024184 dated Sep. 6, 2023.
Machine translation of JP 2018015808 to Makino Milling Machine et al.
Japanese Office Action and its English translation issued in connection with the corresponding Japanese Patent Application No. 2020-544924 dated Jul. 3, 2023.
Machine translation of JP 2011212710A to Shibuya Kogyo Co Ltd.
Machine translation of JP 2011235347 to Sugino Mach.
Machine translation of DE 102007013623 A to Trumpf Werkzeugmaschinen GMBH.

* cited by examiner

APPARATUS FOR MACHINING A WORKPIECE WITH A LASER BEAM COUPLED INTO A FLUID JET, WITH AUTOMATIC LASER-NOZZLE ALIGNMENT; METHOD OF ALIGNING SUCH A BEAM

TECHNICAL FIELD

The present invention relates to an apparatus for machining a workpiece with a laser beam coupled into a fluid jet. According to the present invention, the apparatus is specifically configured to automatically align the laser beam with an aperture of a nozzle unit for producing the fluid jet (automatic laser-nozzle alignment). The invention relates also to a method for aligning a laser beam for machining the workpiece, in particular aligning the laser beam with the aperture of the nozzle unit.

BACKGROUND

A conventional apparatus for machining a workpiece with a laser beam coupled into a fluid jet is generally known. In order to machine the workpiece with the laser beam, the laser beam is guided in the fluid jet onto the workpiece by means of total internal reflection. The fluid jet is generated by a fluid jet generation nozzle having a bore or similar aperture. The laser beam is then coupled by at least one optical element through the nozzle bore into the fluid jet. Accordingly, before starting the workpiece machining process, it is necessary to align the laser beam with the nozzle bore.

To this end, in the conventional apparatus, the laser beam is usually defocused and then directed onto the fluid jet generation nozzle. The fluid jet generation nozzle may thus be viewed by a user of the conventional apparatus, e.g. by means of a camera, in order to visually identify the nozzle bore. Subsequently, the laser beam may be moved towards the bore, and may finally be focused to couple it through the bore and into the fluid jet. This procedure is rather time consuming and error prone.

Since the defocused laser beam lights up the entire fluid jet generation nozzle, an automatic alignment of the laser beam and the bore does not work well. One reason is that the position of the nozzle bore is per se relatively hard to determine in this lit up scenario. Another reason is that the determination of the bore position and its alignment with the laser beam may be further complicated, for example, by dot contaminations present on the fluid jet generation nozzle. Such dot contaminations may have a similar size and shape than the bore, i.e. they may look similar e.g. on the camera image, and thus increase the probability of a wrong alignment of the laser beam.

In view of these problems and challenges, the present invention aims at improving the conventional apparatus, in particular with respect to aligning the laser beam with the fluid jet generation nozzle. It is accordingly an object of the invention to provide an apparatus and method for automatically and precisely aligning the laser beam with an aperture of a fluid jet generation nozzle unit. In particular, the success rate of this automatic laser-nozzle alignment should be high with few or even no errors. Further, the time required for the automatic laser-nozzle alignment should be as short as possible. In particular, compared to the above-described conventional apparatus, aligning the laser beam with the fluid jet generation nozzle should be performed faster and more precisely. Thereby, the invention aims also for a simple and compact apparatus implementation.

SUMMARY OF THE INVENTION

The object of the present invention is achieved by the solution provided in the enclosed independent claims. Advantageous implementations of the present invention are defined in the dependent claims.

In particular, the present invention proposes an automatic laser-nozzle alignment procedure that bases on optically sensing laser beam reflections from the nozzle, and computationally evaluating these reflections to find the perfect alignment.

A first aspect of the present invention provides an apparatus for machining a workpiece with a laser beam coupled into a fluid jet, the apparatus comprising a laser unit for providing the laser beam, a nozzle unit with an aperture for producing the fluid jet, an optical unit configured to provide the laser beam from the laser unit onto the nozzle unit, a control unit configured to control the optical unit and/or nozzle unit to change a point of incidence of the laser beam on the nozzle unit, a sensing unit configured to sense laser light reflected from a surface of the nozzle unit and produce a sensing signal based on the sensed reflected laser light, wherein the control unit is configured to evaluate the sensing signal and to determine a defined sensing pattern in the sensing signal indicative of the laser beam being fully and/or partially aligned with the aperture.

The apparatus of the first aspect enables a precise automatic laser-nozzle alignment. One main improvement of the apparatus is the sensing unit being able to detect and distinguish reflected laser light coming from different portions of the nozzle unit. Another improvement of the apparatus is the control unit being on the one hand able to control the sensing unit and evaluate in real-time its sensing signal, and on the other hand being able to precisely control the position (point of incidence) of the laser beam (typically as a light spot) on the nozzle unit. In particular, the close interaction of the control unit, the sensing unit and the optical unit of the apparatus make the automatic laser-nozzle alignment fast and precise.

For instance, the control unit may control an automatic scan of at least a part of the surface of the nozzle unit with the laser beam—by accordingly controlling the optical unit—and thereby precisely detect the nozzle aperture (with the laser beam) based on the sensing signal and particularly the appearance of the sensing pattern. The appearance of the sensing pattern indicates that the laser beam is at least partially aligned with the nozzle aperture, i.e. that the laser beam (e.g. spot) shows at least partial lateral overlap with the (typically round) aperture. Optionally, the control unit may also determine further characteristic signal patterns in the sensing signal, e.g. signal patterns that are indicative of the laser beam impinging on dot contaminations or other structures on and/or of the nozzle unit, in order to support an even more accurate detection of the nozzle aperture.

The "laser unit" may be a laser source of the apparatus, the laser source being configured to generate the laser beam and provide it to the optical unit. Alternatively, the laser unit may be a laser port or inlet of the apparatus, the laser port or inlet being configured to receive and couple a laser beam from e.g. an external laser source into the apparatus, and preferably towards the optical unit.

The "point of incidence" may be the point or area on the nozzle unit surface, which is illuminated by the laser beam, i.e. the point or area where the laser beam impacts on the nozzle unit. It may also be or include at least a part of the aperture when the laser beam enters the aperture at least partly. In other words, the point of incidence may be any point or area on the surface and/or in the aperture of the nozzle unit. Depending, for instance, on the diameter of the laser beam and/or on whether the laser beam is focused or defocused onto the nozzle unit, the point of incidence may be a smaller or larger point or region on the nozzle unit. Typically, the point of incidence is defined by a light spot caused by focusing the laser beam on the nozzle unit.

The "sensing pattern" may be a characteristic strength, shape or time-development of the sensing signal. For instance, the sensing pattern may be the sensing signal that is output by the sensing unit, if an image of the reflected laser light on the sensing unit changes from a smaller and/or brighter spot to a larger and/or darker spot or vice versa. The sensing pattern may indicate a full and/or partial lateral overlap of the image of the reflected laser light on the sensing unit with an image of the nozzle aperture on the sensing unit. A sensing pattern indicative of the laser beam being "fully and/or partially" aligned with the aperture may mean a sensing pattern that appears in the sensing signal as soon as the laser beam shows any overlap with the aperture. It may also mean the appearance of a first sensing pattern that is specifically indicative of a full alignment, and/or a second sensing pattern that is specifically indicative of a partial alignment. In particular, when the point of incidence is changed continuously or at least multiple times, one or more sensing patterns in the sensing signal can appear/vanish, develop or change, e.g. the appearance of the second sensing pattern may be followed by the appearance of the first sensing pattern.

The "sensing unit" is, for example, a sensor or photodetector able to convert the reflected laser light falling on its sensing surface (i.e. the image of the laser beam on the nozzle unit) into the (electrical) sensing signal. The sensing unit can be a part of a camera, which camera may further include imaging means, like a display unit, to visualize the sensing signal, e.g. to reproduce the image of the reflected laser light on the sensing unit.

The "nozzle unit" may, for example, be a solid block or stone of a nozzle material e.g. sapphire or diamond, or metal, ceramics, and/or an insulator material. The nozzle aperture is, for example, a bore through the solid block or stone, i.e. a bore through the nozzle material. The nozzle aperture has, for example, a diameter of 10-200 µm, and the fluid jet has, for example, a diameter of about 0.6-1 times the diameter of the nozzle aperture. The fluid jet is thereby particularly a pressurized fluid jet with a pressure of, for instance, 50-800 bar.

The "nozzle aperture" is particularly part of the "nozzle surface". The sensing unit is at least configured to sense laser light reflected from the solid part of the nozzle surface, i.e. reflected from the surface of the nozzle material. However, the sensing unit may also be configured to sense laser light reflected from the "nozzle aperture", for instance, when the laser light is back-reflected/back-scattered from fluid in the nozzle aperture.

The "control unit" may be a microcontroller, a processing unit, a processor, and/or a personal computer operated by a software. The software may specifically be configured to record and/or evaluate the sensing signal and/or to analyze an image based on the sensing signal output on imaging means.

In an implementation form of the apparatus, the control unit is configured to control the optical unit to produce a lateral displacement of the laser beam relative to the nozzle unit.

By causing the lateral displacement, the control unit is configured to control the change of the point of incidence of the laser beam on the nozzle unit "Lateral displacement" means particularly a displacement in an x- and/or y-direction ($\Delta x/\Delta y$) with the propagation direction of e.g. the fluid jet and the laser beam as finally coupled into the fluid jet being into the z-direction. The x-y-plane of the lateral displacement may coincide with a surface plane of the nozzle unit, and the aperture may be through the nozzle unit along the z-direction. The optical unit may be configured to displace the output laser beam not only with respect to the nozzle unit, but also with respect to the laser beam as received from the laser unit.

In a further implementation form of the apparatus, at least one part of the optical unit is movable, in particular rotatable, and the control unit is configured to control a movement, in particular a rotation, of the at least one part of the optical unit to change the point of incidence of the laser beam on the nozzle unit.

By controlling the movement of the at least a part of the optical unit, for instance, of one or more optical elements (e.g. mirrors) of the optical unit, the control unit is able to effect a scan of the nozzle unit surface with the laser beam by changing the point of incidence multiple times in steps or continuously. Thus, the control unit can precisely determine one or more points of incidence, for which the sensing pattern appears in the sensing signal. Thereby, the control unit can perform and complete the automatic laser-nozzle alignment.

In a further implementation form of the apparatus, the nozzle unit is movable, and the control unit is configured to control a movement of the nozzle unit to change the point of incidence of the laser beam on the nozzle unit.

The apparatus may also be configured such that the control unit can change the point of incidence by controlling both (a movement of) the optical unit and the nozzle unit, either at the same time or after each other. This gives the apparatus the greatest flexibility of scanning the nozzle surface.

In a further implementation form of the apparatus, the control unit is configured to control the optical unit and/or nozzle unit to continuously and/or stepwise change the point of incidence of the laser beam on the nozzle unit according to a determined movement pattern and to continuously and/or repeatedly evaluate the sensing signal.

In this way, the control unit can cause a surface scan of the nozzle unit with the laser beam, and can achieve the automatic laser-nozzle alignment by monitoring the sensing signal, and controlling the optical unit and/or nozzle unit based on the sensing signal and the determined sensing pattern, respectively.

The movement pattern may be a spiral pattern and/or any other pattern which causes an image of the reflected laser light on the sensing unit to move along a spiral or other pattern.

With such a spiral pattern, the apparatus can complete the automatic laser-nozzle alignment in a time-optimized manner. The movement pattern may not only be a spiral pattern, but may particularly be a spiral pattern and/or a zigzag pattern and/or a reciprocal scanning pattern. Accordingly, different patterns can be combined.

In a further implementation form of the apparatus, the control unit is configured to interrupt the control of the optical unit and/or nozzle unit to change the point of incidence of the laser beam on the nozzle unit, when it determines the sensing pattern in the sensing signal.

When the sensing pattern is determined, the control unit may decide that the laser beam is aligned sufficiently with the nozzle aperture, and may thus end the automatic laser-nozzle alignment procedure, in order to keep the procedure as short as possible.

In a further implementation form of the apparatus, the reflected laser light passes through at least a part of the optical unit and/or is provided by the optical unit to the sensing unit.

In this way, a particularly simple and compact apparatus implementation is possible.

In a further implementation form of the apparatus, the optical unit includes a first deflection element and a second deflection element, the first deflection element is configured to provide the laser beam from the laser unit to the second deflection element, and the second deflection element is configured to provide the laser beam from the first deflection element to the nozzle unit.

Such an optical unit is relatively simple and cheap in fabrication, but can be built very compact. A "deflection element" may be a mirror or any other optical element that is able to reflect and/or direct the laser beam in a controlled manner. The optical unit in this implementation can be efficiently and precisely controlled by the control unit.

In a further implementation form of the apparatus, the first deflection element and/or second deflection element is rotatable to produce the change of the point of incidence of the laser beam on the nozzle unit.

For instance, the two optical deflection elements may be mirrors each with a changeable inclination angle for causing a lateral displacement of the laser beam downwards from its origin (e.g. the laser unit), and thus a change of the point of incidence on the nozzle unit. At least one of the deflection elements may be motorized, and its motor movement may be precisely controlled by the control unit. With such deflection elements, a simple implementation of the optical unit for nevertheless accurate results is achieved.

In a further implementation form of the apparatus, the apparatus further comprises at least one optical element configured to focus the laser beam onto the nozzle unit.

In contrast to the conventional apparatus, the automatic laser-nozzle alignment procedure may be carried out by the apparatus of the first aspect with a focused laser beam. This makes the procedure more precise, and avoids defocusing and focusing of the laser beam each time it has to be aligned with the nozzle aperture. Accordingly, the duration of the automatic laser-nozzle alignment can be reduced.

In a further implementation form of the apparatus, the at least one optical element includes a first optical element for providing the laser beam from the laser unit to the optical unit and a second optical element for providing the laser beam from the optical unit to the nozzle unit, and the first optical element and/or the second optical element is movable, in particular along the propagation direction of the laser beam.

The "propagation direction" of the laser beam may, for example, be the along vertical direction and/or z-direction, while the optical unit can displace the laser beam and/or change the point of incidence of the laser beam on the nozzle unit in the lateral and/or x-y-direction. However, the propagation direction of the laser beam may be changed at least once in the apparatus, for example, by deflection elements of the optical unit. Thus, the propagation direction of the laser beam is not necessarily the same for the first optical element and the second optical element. Therefore, each optical element may be movable along the propagation direction of the laser beam it receives and/or outputs.

In a further implementation form of the apparatus, the at least one optical element includes a third optical element for adjusting an image of the reflected laser light on the sensing unit.

For example, the third optical element may be used to change the image from a smaller and/or brighter spot to a larger and/or larger and/or darker spot or vice versa. To this end, the third optical element may particularly be moved along the propagation direction of the laser beam that it receives and/or outputs.

A second aspect of the present invention provides a method for aligning a laser beam for machining a workpiece, the method comprising providing the laser beam, providing the laser beam to a nozzle unit with an aperture, changing a point of incidence of the laser beam on the nozzle unit, sensing laser light reflected from a surface of the nozzle unit to produce a sensing signal based on the sensed reflected laser light, evaluating the sensing signal to determine a defined sensing pattern in the sensing signal indicative of the laser beam being fully and/or partially aligned with the aperture.

The method of the first aspect achieves the same advantages and effects as described above for the apparatus of the first aspect. Also, the same definitions and explanations of the various terms apply.

In an implementation form of the method, the method further comprises focusing the laser beam onto the nozzle unit.

As explained above, the preciseness of the automatic laser-nozzle alignment is thereby improved, and also the time for carrying out the alignment is reduced.

In a further implementation form of the method, the method further comprises, for changing the point of incidence of the laser beam on the nozzle unit, initially setting the point of incidence of the laser beam such that an image of the reflected laser light is centered on a sensing unit for producing the sensing signal, and moving the point of incidence of the laser beam on the nozzle unit according to a determined movement pattern thereby generating an image of that movement pattern on the sensing unit, and stopping the movement if determining the sensing pattern in the sensing signal.

In this manner, the automatic laser-nozzle alignment can be carried out fast and very precisely.

In a further implementation form of the method, the method further comprises aligning the laser beam with the aperture by changing the point of incidence of the laser beam on the nozzle unit based on the sensing pattern in the sensing signal.

In this way, a precise fine-alignment of the laser beam within the aperture can be carried out. For instance, the method may evaluate (e.g. by means of a control unit), how the sensing pattern changes, or whether or when it vanishes, if the point of incidence is (e.g. marginally) changed along one or more lateral directions. Thus, the perfect alignment of the laser beam based on the observed sensing pattern and its changes can be set.

In a further implementation form of the method, the movement pattern is a spiral pattern and/or any other pattern which causes the image of the reflected laser light to move along a spiral or other pattern.

With the specific movement pattern, the automatic laser-nozzle alignment of the laser beam and the nozzle aperture can be completed fast and precisely.

In a further implementation form of the method, the sensing pattern indicative of the laser beam being fully and/or partially aligned with the aperture results from a change of the image of the reflected laser light on the sensing unit from a smaller and/or brighter spot to a larger and/or darker spot or vice versa.

The change from a "smaller and/or brighter spot to a larger and/or darker spot or vice versa" includes at least a change of the spot from: "smaller to larger or vice versa", "brighter to darker or vice versa", and "smaller and brighter to darker and larger or vice versa". Thereby, a change from "brighter to darker or vice versa" comprises a change of the spot from "larger and brighter to smaller and darker". Likewise, a change from "smaller to larger or vice versa" comprises a change of the spot from "smaller and darker to larger and brighter".

In particular, the image of the nozzle aperture typically becomes bright, when the laser beam is at least partially aligned with it. Due to the fluid jet that is generated by the nozzle unit/aperture (typically also during the laser-nozzle alignment procedure) the image may not be as bright as the image of the laser beam (spot) on the nozzle surface. Thus, a distinctive sensing pattern particularly usable for aligning the laser beam with an active fluid jet generation nozzle may be defined. The sensing pattern accordingly allows a precise automatic laser-nozzle alignment.

In a further implementation form of the method, the sensing pattern indicates full and/or partial lateral overlap of the image of the reflected laser light with an image of the aperture, in particular when moving the point of incidence according to the movement pattern.

Thus, the sensing pattern in the sensing signal is a precise fingerprint of the alignment of the laser beam and the aperture, and can be used to accurately perform the automatic laser-nozzle alignment.

In a further implementation form of the method, the method further comprises, controlling at least one optical element to adjust the image of the reflected laser light on the sensing unit, in particular to cause a change from a smaller and/or brighter image to a larger and/or darker image or vice versa.

The controlling of the at least one optical element may comprise controlling a movement of at least a part of the optical element. The image can, for instance, be focused or defocused on the sensing unit.

BRIEF DESCRIPTION OF DRAWINGS

The above-described aspects and preferred implementation forms of the present invention are explained in the following description of specific embodiments in relation to the enclosed drawings, in which.

DETAILED DESCRIPTION OF EMBODIMENTS

Figure 1:
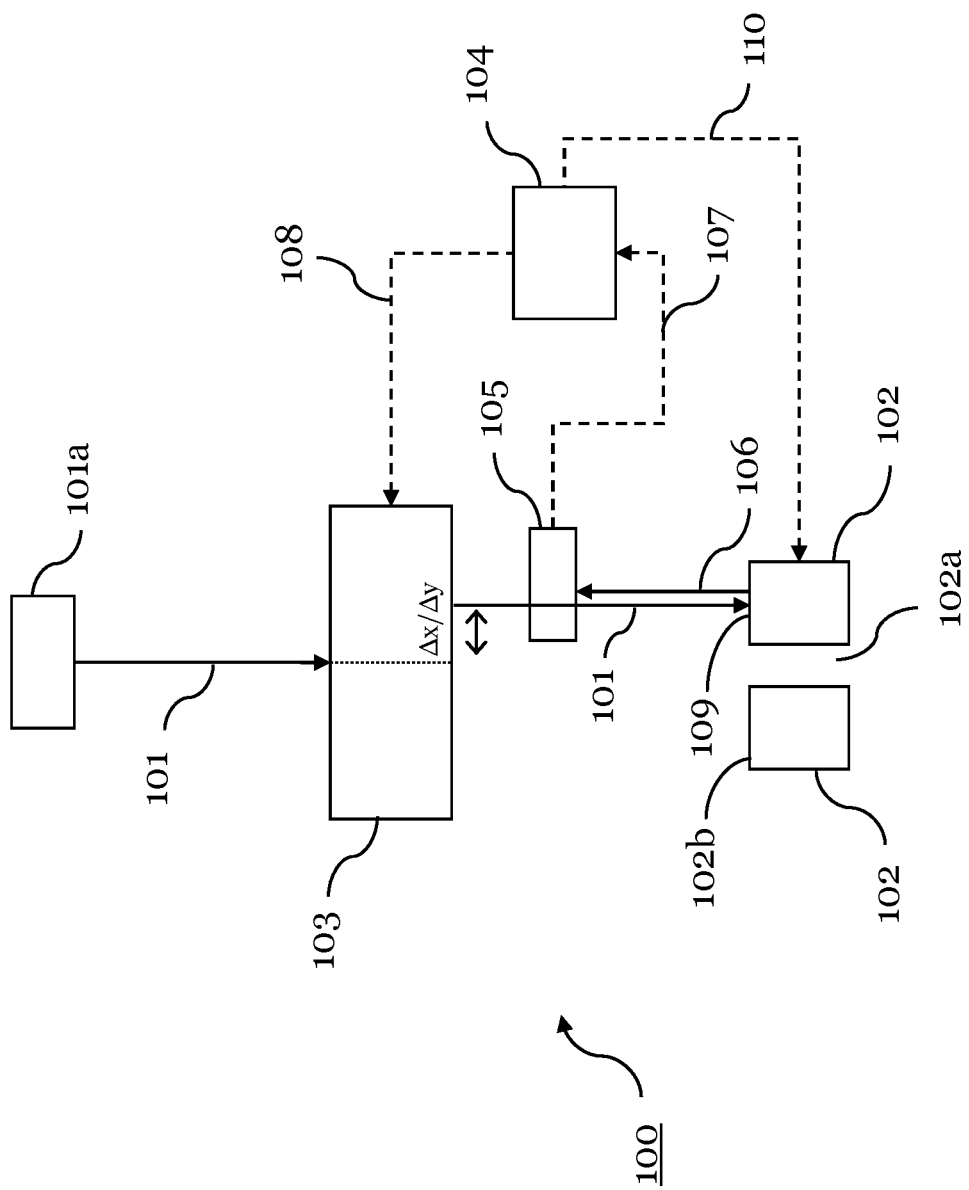
FIG. 1 shows an apparatus according to an embodiment of the present invention.

FIG. 1 shows an apparatus 100 according to an embodiment of the present invention. The apparatus 100 is configured to machine a workpiece (not shown) with a laser beam 101 coupled into a fluid jet (not shown). The workpiece may be a made of a material including, for example, metals, ceramics, diamonds, semiconductors, alloys, superalloys, or ultra-hard materials. Machining the workpiece may include cutting or drilling the workpiece, or shaping the workpiece by material ablation in up to three dimensions. The laser beam 101 preferably has a laser power of between 20-400 W or even more. The laser beam 101 may thereby be a pulsed laser beam, but can also be a continuous laser beam. A pressure of the preferably pressurized fluid jet may be between 50-800 bar During the machining of the workpiece, the apparatus 100 is configured to provide the fluid jet onto the workpiece, and to couple the laser beam 101 into the fluid jet by means of at least one optical element and through a nozzle aperture 102a of a nozzle unit 102 that generates the fluid jet. Thereby, the workpiece may be positioned on a machining surface, which may or may not be part of the apparatus 100. In either case, the apparatus 100 is arranged such that it is able to machine the workpiece disposed on the machining surface. The apparatus 100 may control movements of the machining surface in up to five dimensions.

The apparatus 100 of the present invention is particularly designed for performing an automatic alignment of the laser beam 101 with the aperture 102a of the nozzle unit 102. This can be done with or without the fluid jet being actively generated by the nozzle unit 102. Typically, the automatic laser-nozzle alignment is performed with the fluid jet being generated. The components of the apparatus 100 required for this alignment purpose are shown in FIG. 1. In particular, the apparatus 100 comprises a laser unit 101a, the nozzle unit 102, an optical unit 103, a control unit 104, and a sensing unit 105. The shown units of the apparatus 100 may all be concealed in a machining unit or head of the apparatus, or in another kind of enclosure or housing.

The laser unit 101a is configured to provide the laser beam 101, either by directly generating it or by receiving it and coupling it into the apparatus 100. Thus, the laser unit 101a may be a laser source or a laser port or inlet of the apparatus 100. A laser port or inlet may comprise a window, which is transparent for the laser beam 101 provided from an external laser source, and/or may comprise an optical element for focusing, directing and/or dividing the laser beam 101 further in the apparatus 100.

The nozzle unit 102 is configured to produce the fluid jet, when fluid is provided to the apparatus 100. The nozzle unit 102 is preferably disposed within the machining unit/head or housing/enclosure of the apparatus 100, in order to produce the fluid jet in a protected environment. The nozzle aperture 102a defines the width of the fluid jet. Through the nozzle aperture 102a, the laser beam 101 may be coupled into the fluid jet. The nozzle aperture 102a has preferably a diameter of 10-200 μm, and the fluid jet has preferably a diameter of about 0.6-1 times the diameter of the nozzle aperture 102a. The pressure for the preferably pressurized fluid jet may be provided via an external fluid supply, which may be controlled by the control unit 104. The fluid supplied for the fluid jet is preferably water, i.e. the fluid jet is a water jet. For outputting the fluid jet from the apparatus 100, the apparatus 100 preferably includes an exit nozzle with an exit aperture. The exit aperture is preferably wider than the nozzle aperture 102a.

The optical unit 103 is configured to provide the laser beam 101 from the laser unit 101a onto the nozzle unit 102. For instance, the optical unit 103 may receive the laser beam 101 from the laser unit 101a, and may deflect or direct it otherwise towards the nozzle unit 102. Thereby, the optical unit 103 may be configured to produce a lateral displacement of the laser beam 101 relative to at least the nozzle unit 102, wherein the lateral displacement is changeable by e.g. moving, rotating or otherwise controlling the optical unit 103. The optical unit 103 may particularly be controlled by the control unit 104.

The control unit 104 is configured to control the optical unit 103 and/or nozzle unit 102 to change a point of incidence 109 of the laser beam 101 on the nozzle unit 102. For instance, the control unit 104 can move and/or rotate at least a part of the optical unit 103, in order to change the point of incidence 109, and/or can move the nozzle unit 102 for the same effect. If the point of incidence 109 is on the surface 102b of the nozzle unit 102, the laser beam 101 is reflected from the surface 102b.

Figure 2:
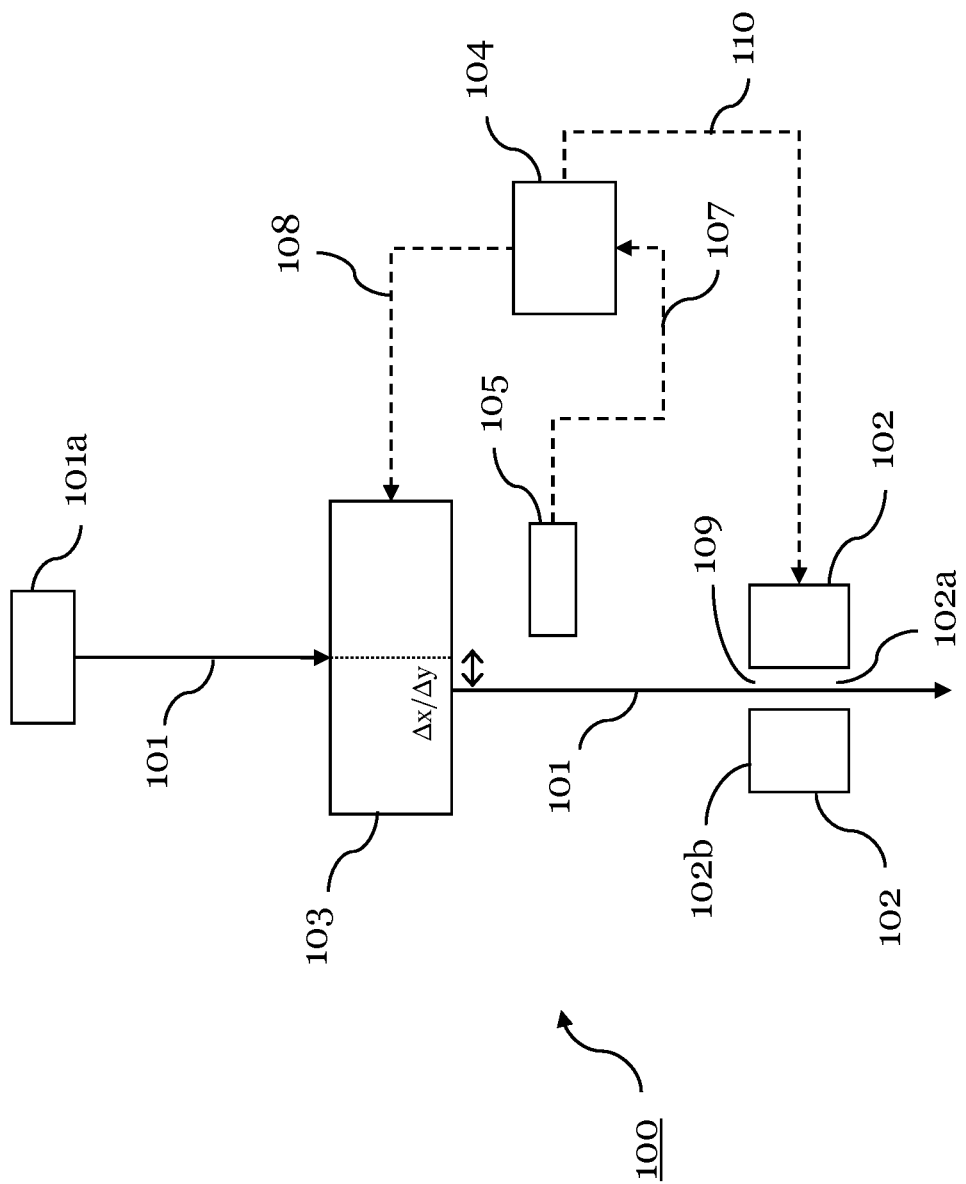
FIG. 2 shows an apparatus according to an embodiment of the present invention.

The sensing unit 105 is arranged and configured to sense such laser light 106 reflected from the surface 102b of the nozzle unit 102, and to produce a sensing signal 107 based on the sensed reflected laser light 106. FIG. 1 shows a scenario, in which the laser beam 101 impacts on the nozzle unit surface 102b, and is reflected from the surface 102b towards and onto the sensing unit 105. FIG. 2 shows the same apparatus 100 shown in FIG. 1 in another scenario, namely with a different relative displacement of the laser beam 101 with respect to the nozzle unit 102, i.e. with a different point of incidence 109 of the laser beam 101 on the nozzle unit 102. In the scenario of FIG. 2, the laser beam 101 is aligned with the nozzle aperture 102a. Thus, it is not directly reflected from the surface 102b of the nozzle unit 102 towards and onto the sensing unit 105. Nevertheless, also in this scenario the sensing unit 105 may detect reflected laser light, which is back-reflected/back-scattered from the fluid for forming the fluid jet within the aperture 102b.

In any case, the sensing signal 107 produced by the sensing unit 105 changes when the point of incidence 109 is changed on the nozzle unit 102, and particularly when the laser beam 101 suddenly overlaps partially and/or fully with the nozzle aperture 102a. Accordingly, the sensing signal 107 exhibits at least one characteristic sensing pattern depending on the alignment or misalignment of the laser beam 101 and the aperture 102a.

Therefore, the control unit 104 is configured to evaluate the sensing signal 107 and to determine a defined sensing pattern in the sensing signal 107 indicative of the laser beam 101 being fully and/or partially aligned with the aperture 102a. The sensing pattern may be predefined or learned by the control unit 104. Thus, the control unit 104 is configured to determine that the laser beam 101 is at least partially aligned with the nozzle aperture 102a based on the sensing signal 107.

For instance, the control unit 104 may control (by means of a control signal 108) the optical unit 103 and/or control (by means of a control signal 110) the nozzle unit 102 to continuously and/or stepwise change the point of incidence 109 of the laser beam 101 on the nozzle unit 102, i.e. to scan the nozzle unit surface 102b, according to a determined movement pattern. Thereby, the control unit 104 may continuously and/or repeatedly evaluate the sensing signal 107, for instance, for one or more defined sensing patterns. If it detects the sensing pattern in the sensing signal 107, it may interrupt the control (by means of the control signals 108 and/or 110) of the optical unit 103 and/or nozzle unit 102 to stop changing the point of incidence 109 of the laser beam 101 on the nozzle unit 102, and thus complete the automatic laser-nozzle alignment procedure.

Figure 3:
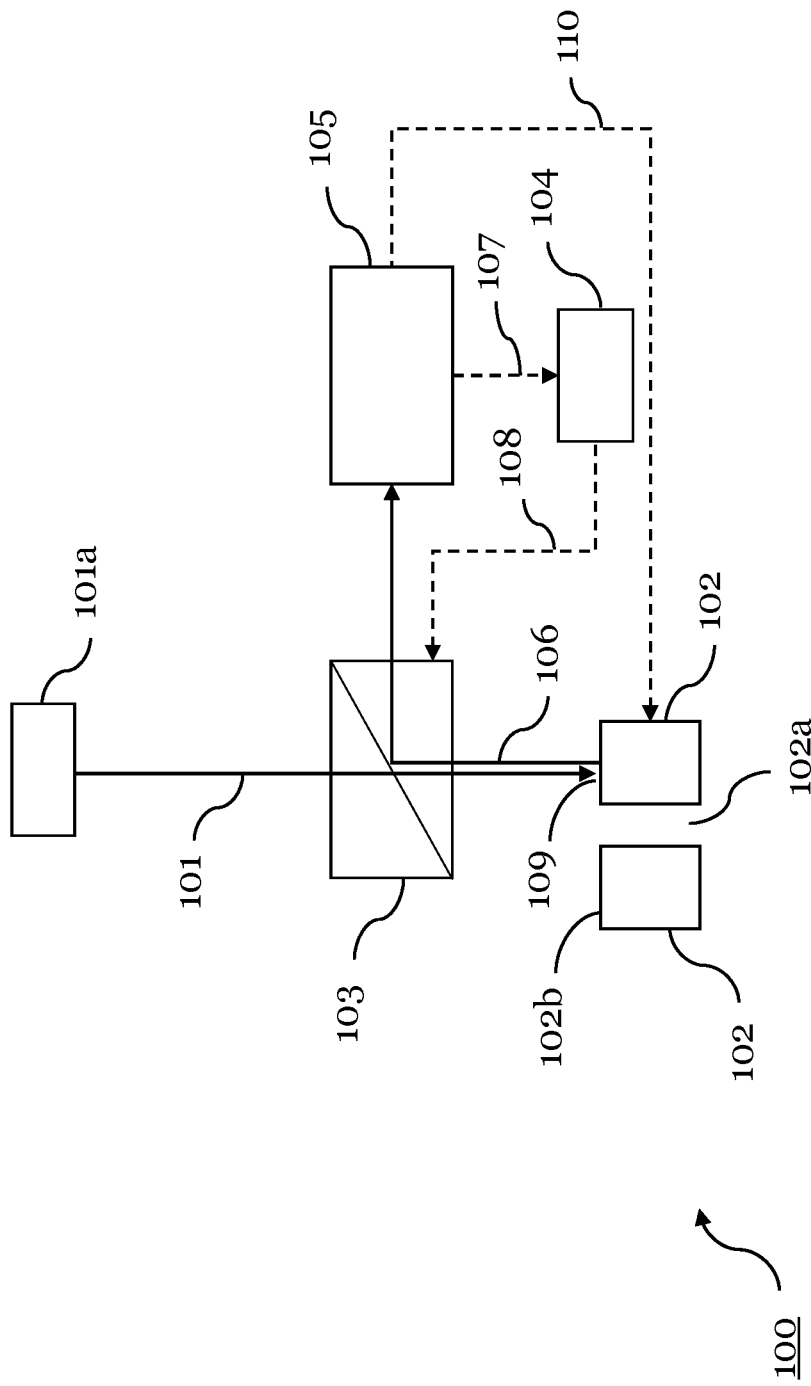
FIG. 3 shows an apparatus according to an embodiment of the present invention.

FIG. 3 shows an apparatus 100 according to an embodiment of the present invention, which builds on the apparatus 100 shown in FIG. 1. Identical elements in FIG. 3 and FIG. 1 are labeled with the same reference signs and function likewise. Accordingly, the apparatus 100 of FIG. 3 also comprises the laser unit 101a, the nozzle unit 102, the optical unit 103, the control unit 104, and the sensing unit 105.

FIG. 3 shows specifically that the reflected laser light 106 may pass through at least a part of the optical unit 103 and/or may be provided or directed by the at least a part of the optical unit 103 to the sensing unit 105. That is, the optical unit 103 may be both configured to provide or direct the laser beam 101 from the laser unit 101a to the nozzle unit 102, and to provide the reflected laser light 106 to the sensing unit 105. For instance, the optical unit 103 can be realized by at least one movable deflection element, like a mirror. However, it can also include further optical elements. In addition, the nozzle unit 102 and/or sensing unit 105 may be movable to ensure that for a certain control setting of the optical unit 103, the laser beam 101 impinges on the nozzle unit 102, and the reflected light 106 reaches the sensing unit 105. By means of such an optical unit 103 as shown in FIG. 3, the apparatus 100 can be built particularly compact.

Figure 4:
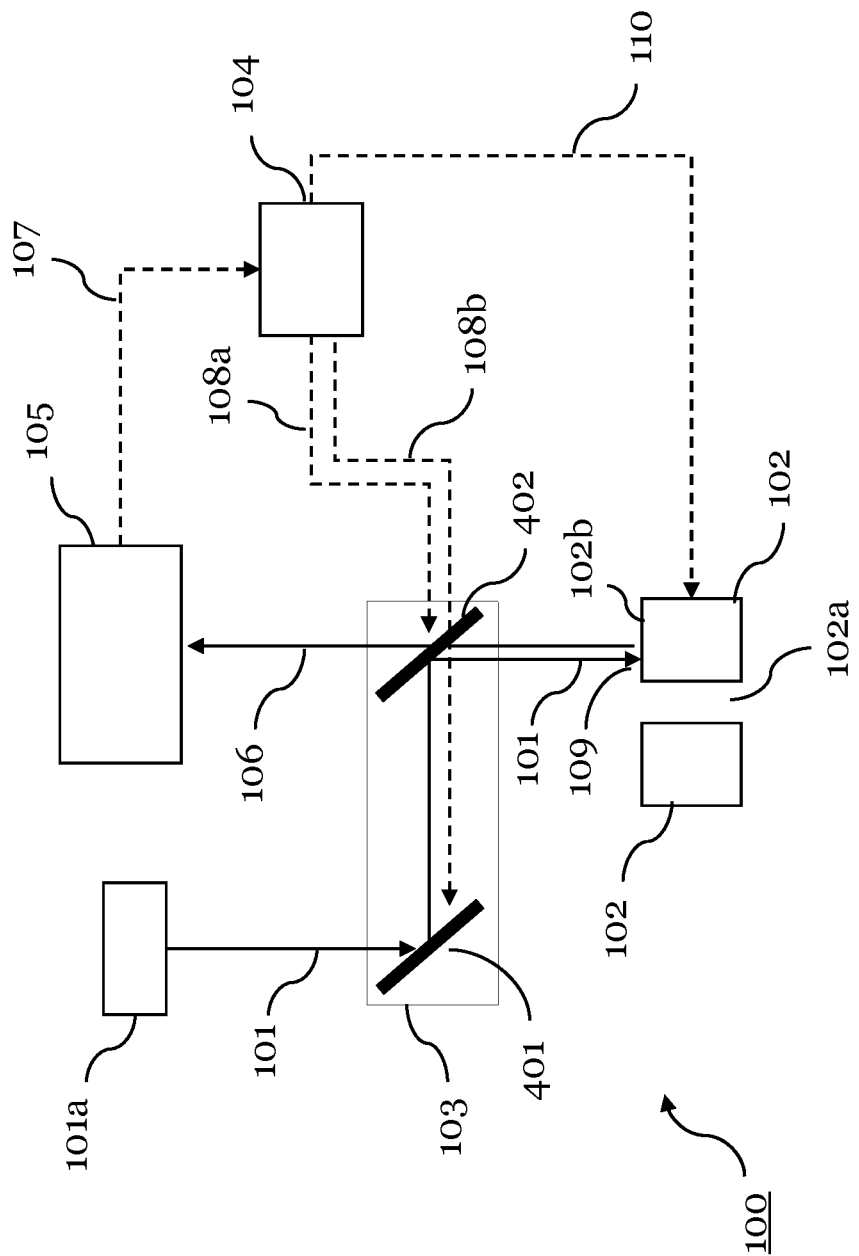
FIG. 4 shows an apparatus according to an embodiment of the present invention.

FIG. 4 shows an apparatus 100 according to an embodiment of the present invention, which builds on the apparatus 100 shown in FIG. 1. Identical elements in FIG. 4 and FIG. 1 are labeled with the same reference signs and function likewise. Accordingly, the apparatus 100 of FIG. 4 also comprises the laser unit 101a, the nozzle unit 102, the optical unit 103, the control unit 104, and the sensing unit 105.

Specifically, the optical unit 103 in FIG. 4 includes a first deflection element 401 and a second deflection element 402. The first deflection element 401 is configured to guide the laser beam 101 from the laser unit 101a to the second deflection element 402, and the second deflection element 402 is configured to guide the laser beam 101 from the first deflection element 401 onto the nozzle unit 102. Both deflection elements 401 and/or 402 may be realized by mirrors, and may be movable and/or rotatable. In particular, the first deflection element 401 and/or the second deflection element 402 may be rotatable, in order to produce a change of the point of incidence 109 of the laser beam 101 on the nozzle unit 102. The control unit 104 may control (by means of control signals 108a and/or 108b) one or both deflection elements 401 and/or 402. The control unit 104 may particularly control a sweep of an inclination angle of one or both of the deflection elements 401 and/or 402, in order to scan at least a part of the surface 102b of the nozzle unit 102 with the laser beam 101. In other words, the control unit 104 may continuously and/or stepwise change the point of incidence 109 of the laser beam 101 on the nozzle unit 102. The scan is preferably realized according to a determined movement pattern, like a spiral pattern. The control unit 104 may also control the sensing unit 105 to continuously and/or repeatedly evaluate the sensing signal 107 during the movement pattern.

Figure 5:
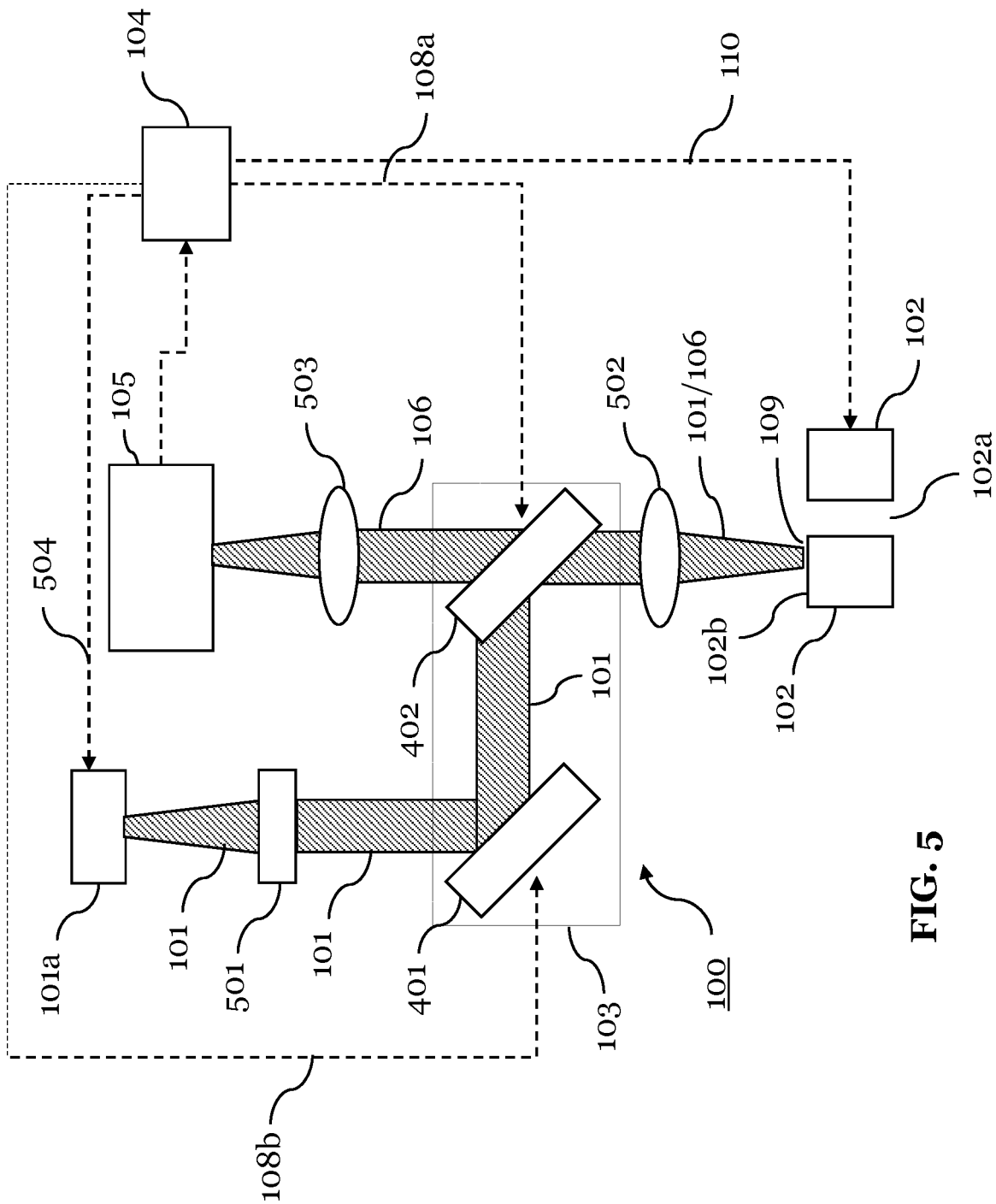
FIG. 5 shows an apparatus according to an embodiment of the present invention.

FIG. 5 shows an apparatus 100 according to an embodiment of the present invention, which builds on the apparatus 100 shown in FIG. 1. Identical elements in FIG. 5 and FIG. 1 are labeled with the same reference signs and function likewise. Accordingly, the apparatus 100 of FIG. 5 also comprises the laser unit 101a, the nozzle unit 102, the optical unit 103, the control unit 104, and the sensing unit 105.

FIG. 5 shows specifically that the apparatus 100 can include one or more optical elements, for instance, three optical elements 501, 502 and 502, e.g. realized by three lenses. The one or more optical elements 501, 502 and 503 may comprise a first optical element 501 for directing the laser beam 101 from the laser unit 101a to the optical unit 103, and a second optical element 502 for directing the laser beam 101 from the optical unit 103 to the nozzle unit 102. By means of the first optical element 501 and/or the second optical element 502, the apparatus 100 may be configured to focus the laser beam 101 onto the nozzle unit 102. To this end, the first optical element 501 and/or the second optical element 502 may be movable, in particular along the propagation direction of the laser beam 101 they respectively receive and/or output. Focusing the laser beam 101 on the nozzle unit 102 may change a size and/or brightness of a laser spot on the surface 102b, and may accordingly change a size and/or brightness of an image of the reflected light spot on the sensing unit 105.

The third optical element 503 may be used to adjust the image of the reflected laser light 106 on the sensing unit 105, e.g. to make it brighter and/or smaller or make it darker and/or wider. To this end, it may be moved along the propagation direction of the laser beam 101 it receives and/or outputs.

Figure 6:
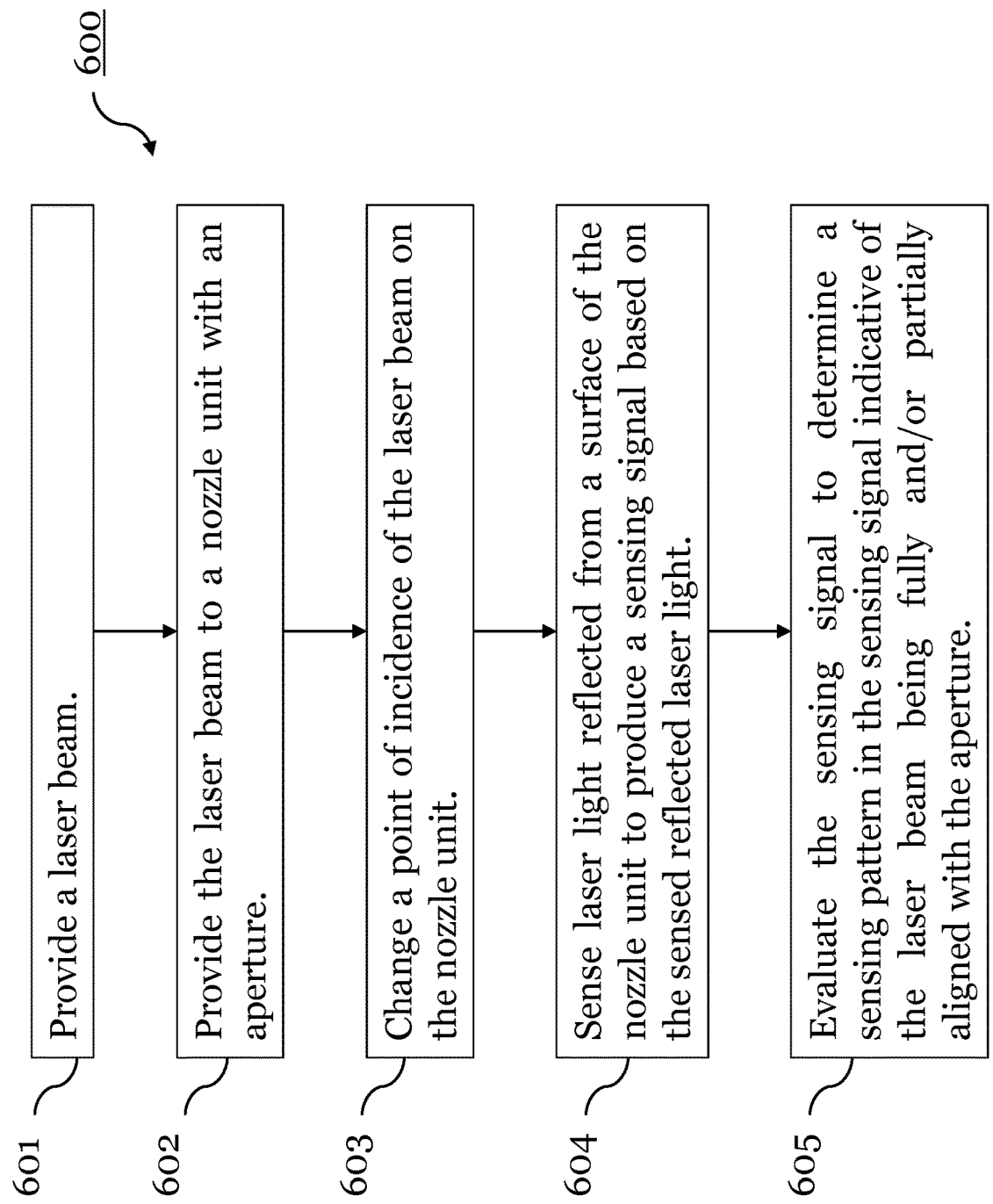
FIG. 6 shows a method according to an embodiment of the present invention.

FIG. 6 shows a method 600 according to an embodiment of the present invention for aligning the laser beam 101 and the nozzle aperture 102a. Accordingly, the method 600 may be carried out by the apparatus 100, as shown in either one of the FIGS. 1-5.

The method 600 comprises a step 601 of providing the laser beam, a step 602 of providing the laser beam 101 to a nozzle unit 102, a step 603 of changing a point of incidence 109 of the laser beam 101 on the nozzle unit 102, a step 604 of sensing laser light 106 reflected from a surface 102b of the nozzle unit 102 to produce a sensing signal 107 based on the sensed reflected laser light 106, and a step 605 of evaluating the sensing signal 107 to determine a single defined sensing pattern or a number of defined sensing patterns in the sensing signal 107 indicative of the laser beam 101 being aligned with the aperture 102a. The arrows in FIG. 6 do not necessarily indicate an order of the steps. In particular, the steps 601-605 may be carried out simultaneously.

Figure 7:
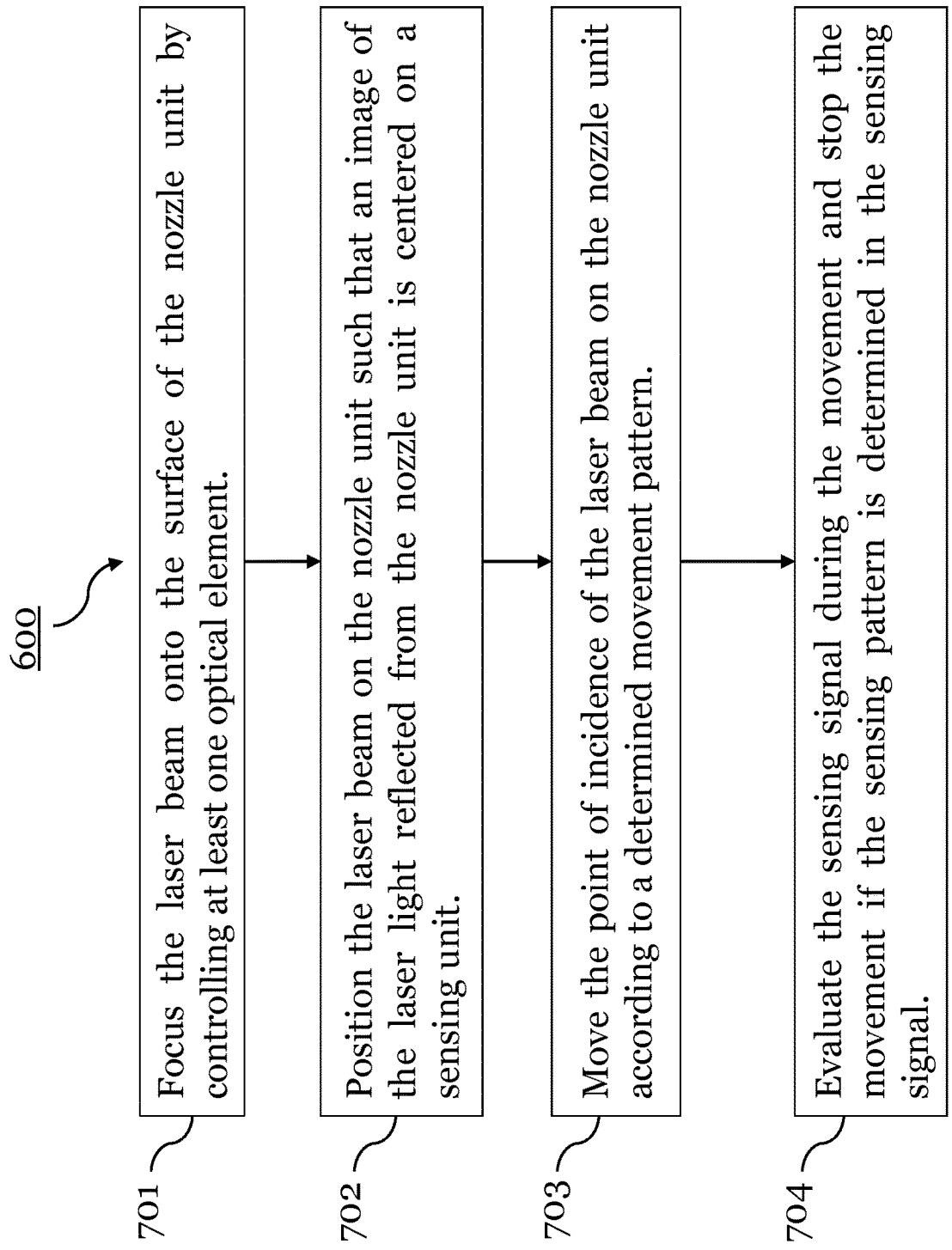
FIG. 7 shows a method according to an embodiment of the present invention.
Figure 8:
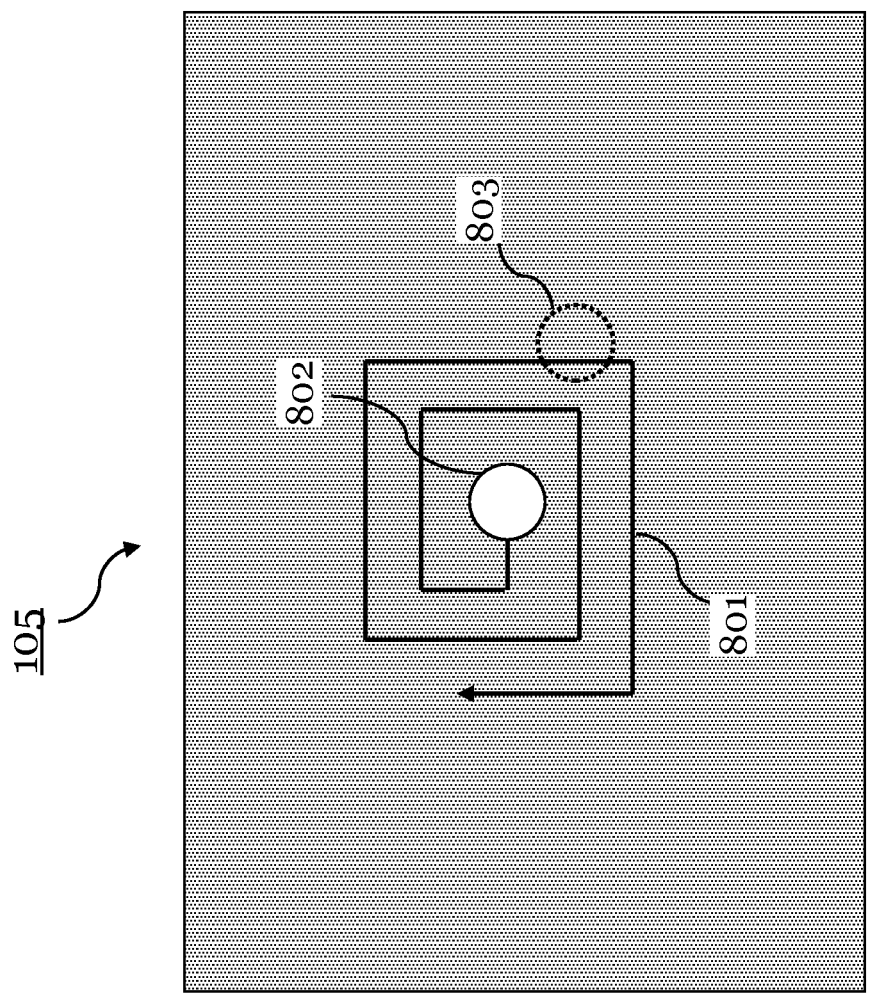
FIG. 8 shows schematically an image of the reflected laser light on the sensing unit, which moves according to a movement pattern used for changing the point of incidence of the laser beam on the nozzle unit.

FIG. 7 shows a method 600 according to an embodiment of the present invention, which builds on the method 600 shown in FIG. 6. FIG. 7 shows specifically details of the steps 602, 603 and 604 shown in FIG. 6. FIG. 8 is used to illustrate the method 600 carried out according to FIG. 7. In particular, FIG. 8 shows schematically an image 802 of the reflected laser light 106 on the sensing unit 105, which moves according to a movement pattern used for changing the point of incidence 109 of the laser beam 101 on the nozzle unit 102.

The provided laser beam 101 may be focused (e.g. as part of step 602) onto the surface 102b of the nozzle unit 102. This can, for instance, be achieved by controlling at least one optical element, e.g. one or both of the optical elements 501 and 502 as shown in FIG. 5. Then, (e.g. as part of the step 603) the point of incidence 109 of the laser beam 101 may be selected 701 such that the image 802 (see FIG. 8) of the reflected laser light 106 is initially centered on a sensing unit 105 (and accordingly appears centered on e.g. a display unit connected to the sensing unit 105 in a camera or the like). Then, the point of incidence 109 of the laser beam 101 on the nozzle unit 102 is changed 702 (e.g. as part of the step 603) according to a determined movement pattern, whereby an image 801 (see FIG. 8) of that movement pattern is generated on the sensing unit 105. The movement of the point of incidence 109 may be stopped 704 (e.g. as part of the step 604), when the sensing pattern is determined in the sensing signal 107.

FIG. 8 shows an example of the image 802 of the reflected light 106 on the sensing unit 105, which represents the movement pattern of changing the point of incidence 109 of the laser beam 101 on the nozzle unit 102. In particular, as shown in FIG. 8, the movement pattern may be a spiral pattern that causes also the image 802 of the reflected laser light 106 to move along a spiral 801. The movement pattern may also be a zigzag pattern and/or a reciprocal scanning pattern, optionally combined with a spiral pattern. At some point, the image 802 may fully or partially overlap (laterally) with an image 803 of the aperture 102a, when the point of incidence 109 is moved along the movement pattern. In this case, the sensing signal 107 may show the sensing pattern indicative of the laser beam 101 being (partially and/or fully) aligned with the aperture 102a. For instance, the sensing pattern may result from a change of the image 802 of the reflected laser light 106 on the sensing unit 105 from a smaller and/or brighter spot against a dark background—when the focused laser beam 101 is reflected from the nozzle unit surface 102b—to a larger and/or darker spot against the darker background—when the laser beam 101 enters the nozzle aperture 102a and is reflected by e.g. the fluid of the fluid jet. The image 802 may also vanish in case that the laser beam 101 goes through the aperture 102a without being scattered and/or reflected (e.g. without fluid jet).

The present invention has been described in conjunction with various embodiments as examples as well as implementation forms. However, other variations can be understood and effected by those persons skilled in the art and practicing the claimed invention, from the studies of the drawings, the description and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An apparatus for machining a workpiece with a laser beam coupled into a water jet, the apparatus comprising
   a laser for providing the laser beam,
   a nozzle with an aperture for producing the water jet,
   one or more mirrors configured to provide the laser beam from the laser onto the nozzle, wherein at least one mirror is movable,
   a processor configured to control a movement of the at least one movable mirror to change a point of incidence of the laser beam on the nozzle, and
   a sensor configured to sense laser light reflected from a surface of the nozzle and produce a sensing signal based on the sensed reflected laser light, wherein the processor is configured to:
control the movement of the at least one movable mirror to perform an automatic scan of at least a part of the surface of the nozzle with the laser beam,
evaluate the sensing signal during the automatic scan,
detect an appearance of a defined sensing pattern in the sensing signal evaluated during the automatic scan, and
determine the laser beam being fully or partially aligned with the aperture of the nozzle based on the appearance of the defined sensing pattern.

2. The apparatus according to claim 1, wherein the processor is configured to control the movement of the at least one movable mirror to produce a lateral displacement of the laser beam relative to the nozzle.

3. The apparatus according to claim 1, wherein the at least one movable mirror is rotatable, and
the processor is configured to control a rotation of the at least one rotatable mirror to change the point of incidence of the laser beam on the nozzle unit.

4. The apparatus according to claim 1, wherein the nozzle is movable, and
the processor is further configured to control a movement of the nozzle to change the point of incidence of the laser beam on the nozzle.

5. The apparatus according to claim 1, wherein the processor is configured to control the movement of the at least one movable mirror to continuously or stepwise change the point of incidence of the laser beam on the nozzle according to a determined movement pattern and to continuously or repeatedly evaluate the sensing signal.

6. The apparatus according to claim 5, wherein the processor is configured to interrupt the control of the movement of the at least one movable mirror to change the point of incidence of the laser beam on the nozzle, when it determines the sensing pattern in the sensing signal.

7. The apparatus according to claim 1, wherein the reflected laser light passes through at least a part of the one or more mirrors or is provided by the one or more mirrors to the sensor.

8. The apparatus according to claim 1, wherein the one or more mirrors includes a first mirror and a second mirror,
the first mirror is configured to provide the laser beam from the laser to the second mirror, and
the second mirror is configured to provide the laser beam from the first mirror to the nozzle.

9. The apparatus according to claim 8, wherein at least one of the first mirror or the second mirror is rotatable to produce the change of the point of incidence of the laser beam on the nozzle.

10. The apparatus according to claim 1, further comprising
at least one lens configured to focus the laser beam onto the nozzle.

11. The apparatus according to claim 10, wherein the at least one lens includes a first lens for providing the laser beam from the laser to the one or more mirrors and a second lens for providing the laser beam from the one or more mirrors to the nozzle, and the first lens or the second lens is movable along the propagation direction of the laser beam.

12. The apparatus according to claim 10, wherein the at least one lens includes a third lens for adjusting an image of the reflected laser light on the sensor.

13. A method for aligning the laser beam for machining the workpiece by using the apparatus according to claim 1, the method comprising
providing the laser beam,
providing the laser beam to a nozzle unit with an aperture for providing a water jet,
changing a point of incidence of the laser beam on the nozzle unit so as to perform an automatic scan of at least a part of a surface of the nozzle with the laser beam,
sensing laser light reflected from the surface of the nozzle unit to produce a sensing signal based on the sensed reflected laser light,
evaluating the sensing signal during the scan to detect an appearance of a defined sensing pattern in the sensing signal evaluated during the automatic scan,
determine the laser beam being fully or partially aligned with the aperture of the nozzle based on the appearance of the defined sensing pattern.

14. The method according to claim 13, further comprising focusing the laser beam onto the nozzle.

15. The method according to claim 13, further comprising, initially setting the point of incidence of the laser beam such that an image of the reflected laser light is centered on a sensor for producing the sensing signal, and moving the point of incidence of the laser beam on the nozzle according to a determined movement pattern thereby generating an image of that movement pattern on the sensor, and stopping the movement if determining the sensing pattern in the sensing signal.

16. The method according to claim 15, further comprising aligning the laser beam with the aperture of the nozzle by changing the point of incidence of the laser beam on the nozzle based on the sensing pattern in the sensing signal.

17. The method according to claim 15, wherein the movement pattern is a spiral pattern or any other pattern which causes the image of the reflected laser light to move along a spiral or other pattern.

18. The method according to claim 15, wherein the sensing pattern indicative of the laser beam being fully or partially aligned with the aperture of the nozzle results from a change of the image of the reflected laser light on the sensor from a smaller or brighter spot to a larger or darker spot or vice versa.

19. The method according to claim 15, wherein the sensing pattern indicates full or partial lateral overlap of the image of the reflected laser light with an image of the aperture of the nozzle when moving the point of incidence according to the movement pattern.

20. The method according to claim 19, further comprising controlling at least one lens to adjust the image of the reflected laser light on the sensor, to cause a change from a smaller or brighter image to a larger or darker image or vice versa.

* * * * *